INVENTOR.
EDWARD G. LOOS

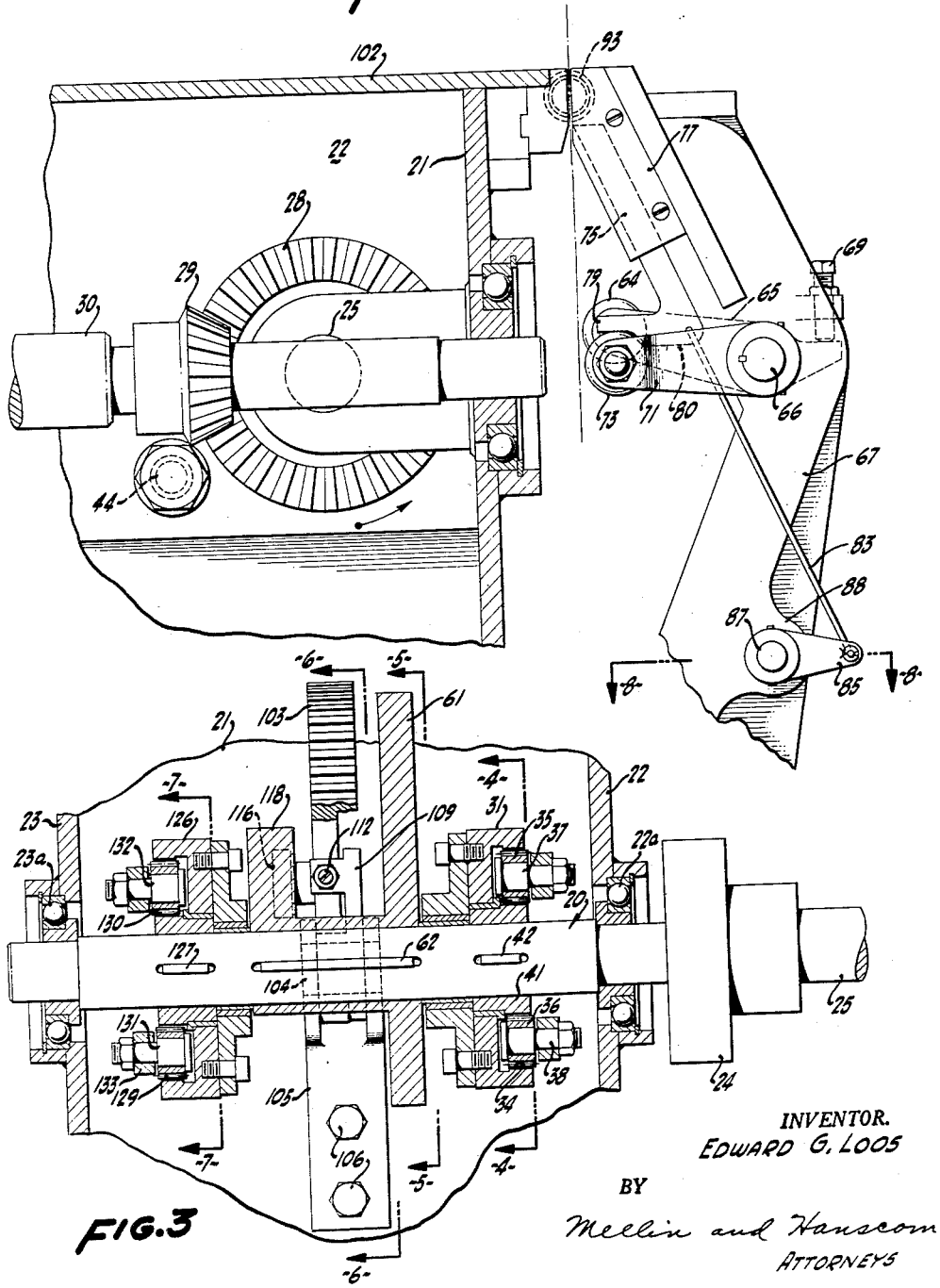

April 5, 1960  E. G. LOOS  2,931,399
CUTTING AND TYING MECHANISM FOR A WIRE TYING MACHINE
Filed Jan. 11, 1954  6 Sheets-Sheet 3

INVENTOR.
EDWARD G. LOOS
BY
Mellin and Hanscom
ATTORNEYS

INVENTOR.
EDWARD G. LOOS
BY
Meelin and Hanscom
ATTORNEYS

April 5, 1960 E. G. LOOS 2,931,399
CUTTING AND TYING MECHANISM FOR A WIRE TYING MACHINE
Filed Jan. 11, 1954 6 Sheets-Sheet 6

INVENTOR.
EDWARD G. LOOS
BY
Meelin and Hanscom
ATTORNEYS

United States Patent Office 2,931,399
Patented Apr. 5, 1960

2,931,399

CUTTING AND TYING MECHANISM FOR A WIRE TYING MACHINE

Edward G. Loos, Oakland, Calif., assignor, by mesne assignments, to John J. Knight, Piedmont, Calif.

Application January 11, 1954, Serial No. 403,192

2 Claims. (Cl. 140—93)

This invention relates generally to a machine for wrapping and tying wire around a package, and more particularly is directed to a knotting and cutting mechanism of such a machine.

Reference is made herein to my copending application entitled "Intermittent Drive Mechanism," Serial No. 403,193, filed January 11, 1954, now Patent No. 2,775,140, in which there is disclosed a wire tying machine adapted to use a cutting and tying mechanism such as that disclosed herein.

In prior wire tying machines, it was the general practice to drive the cam shaft of the cutting and tying mechanism one-half revolution for each cycle of the machine in order to provide the alternate operation of the wire gripping members on succeeding cycles of the machine. This type of operation required two lobe cams for actuating the twisting mechanism and the cutting knives. Using cams of this type required that the cams have a very sharp rise and resulted in excessive strain on the cams and cam followers.

It is the object of this invention to provide a cutting and tying mechanism wherein the cam shaft makes a complete revolution for each cycle of the machine, whereby single lobe cams may be employed for the twisting and cutting mechanisms.

A further object is to provide a cutting and tying mechanism wherein the cams controlling the action of the wire gripping elements are rotatably mounted on the cam shaft and are geared thereto to rotate at one-half the speed of the cam shaft.

A still further object of this invention is to provide a wire tying machine wherein the cam shaft and all the driving mechanism associated therewith are located within the same gear housing as the main drive for the machine, and only the cutting knives are located outside of said housing.

Various other objects of the present invention will become apparent in reading the following detailed specification in conjunction with the accompanying drawings, in which:

Fig. 2 is a partial end view of the gear housing with the end wall removed to show the driving connection for the cam shaft.

Fig. 3 is a sectional view through the center of the cam shaft taken on line 3—3 of Fig. 1.

Figs. 4 through 7 are sectional views taken respectively on lines 4—4, 5—5, 6—6 and 7—7 of Fig. 3.

Figure 8:
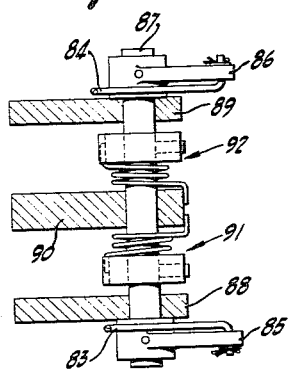

Fig. 8 is a sectional view taken on line 8—8 of Fig. 2, showing the details of the knife retracting mechanism.

Figures 1, 9:
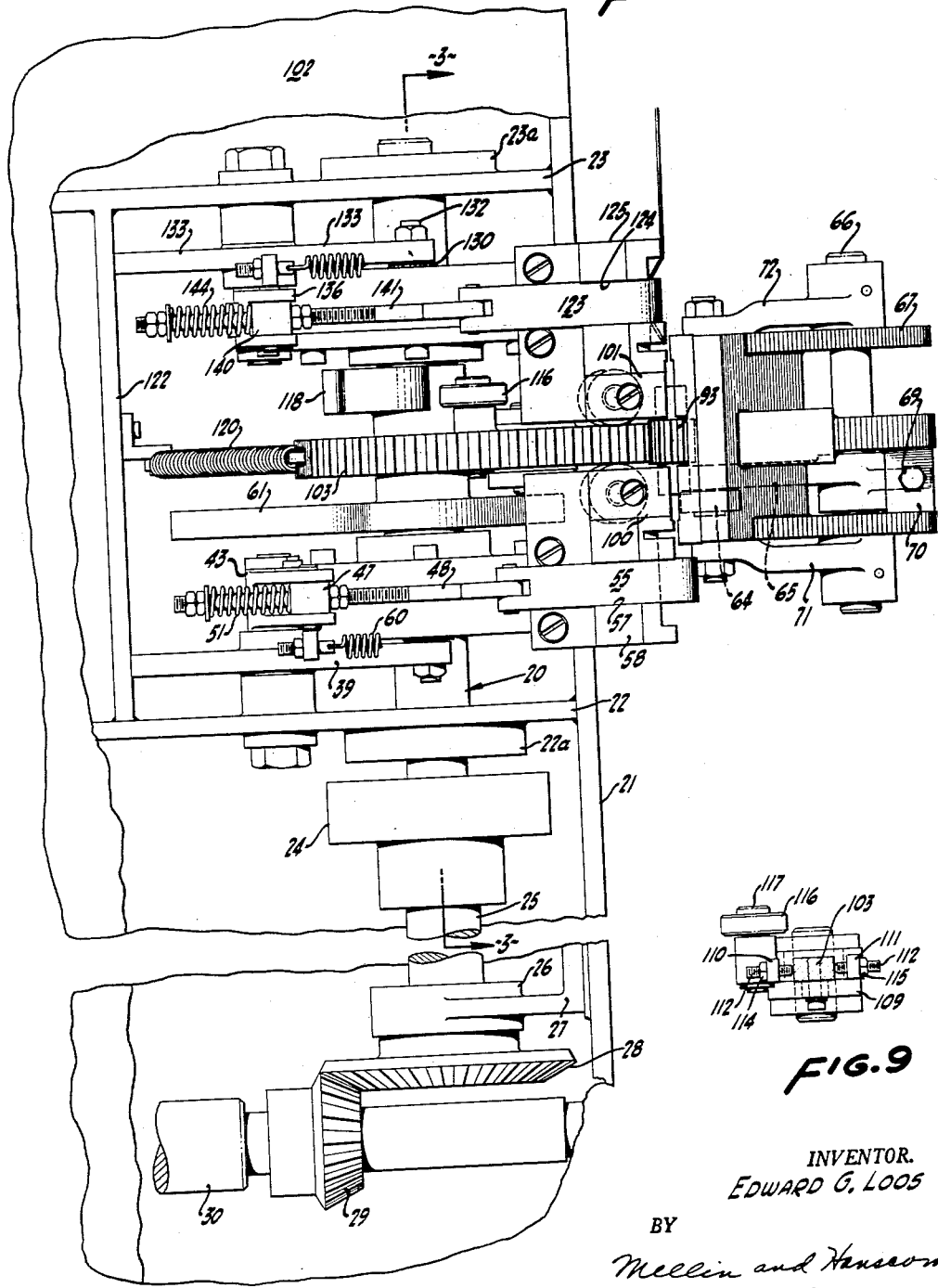
Fig. 1 is a plan view of the gear housing of a machine embodying the principles of my invention, with a portion of the upper surface of the housing broken away.
Figure 6:
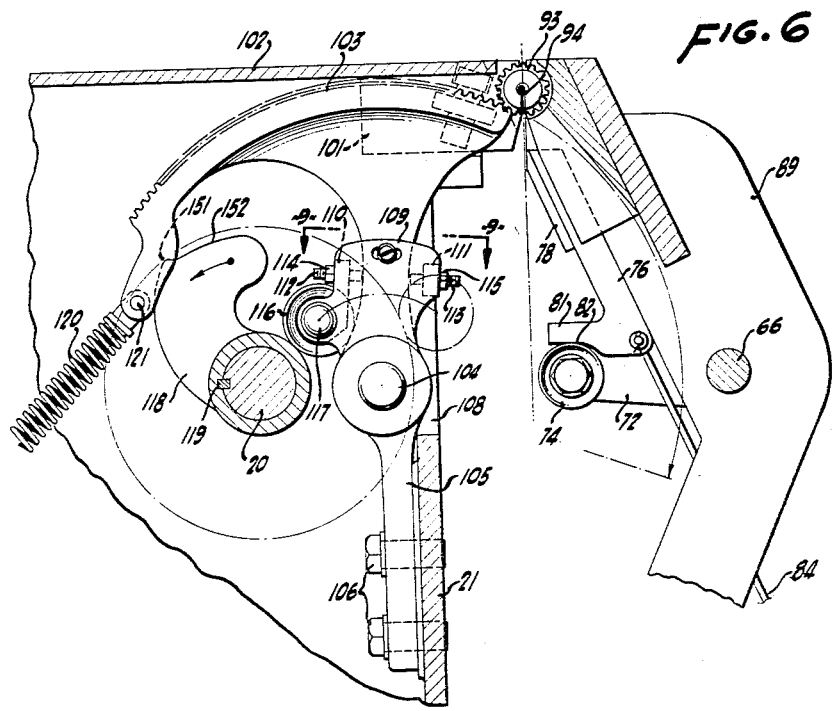

Fig. 9 is a sectional view taken on line 9—9 of Fig. 6, showing the details of the sector drive cam follower.

Figure 10:
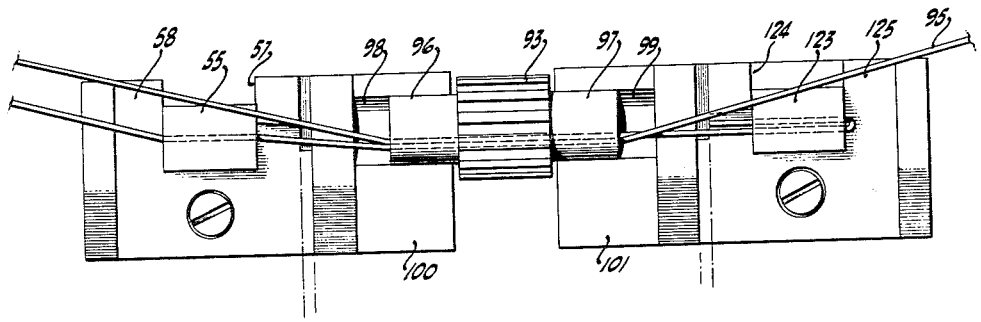

Fig. 10 is a front view of the twisting and gripping mechanisms with the cutting knives and the supporting arm therefor removed, the parts being shown just prior to the twisting portion of the cycle.

Figure 11:
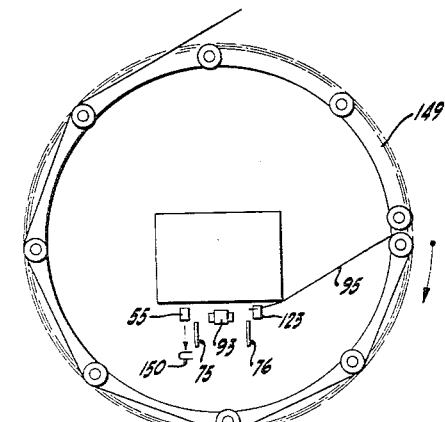
Figure 12:
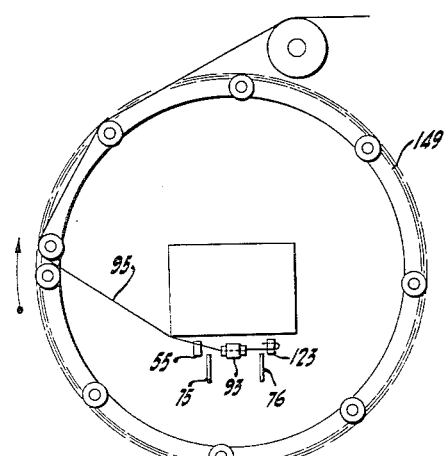
Figure 13:
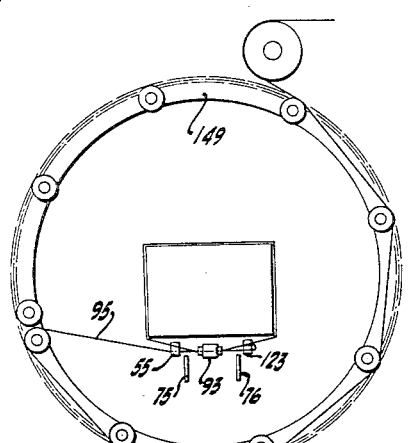

Figs. 11 to 13 inclusive, are schematic views showing the relation of the wrapping ring to the package at various portions of the machine cycle. Fig. 11 shows the parts at the start of a cycle. Fig. 12 shows the parts at an intermediate part of the cycle, and Fig. 13 shows the parts at the end of the wrapping cycle just prior to the twisting and cutting operations.

Figure 14:
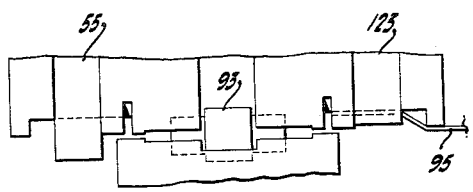
Figure 15:
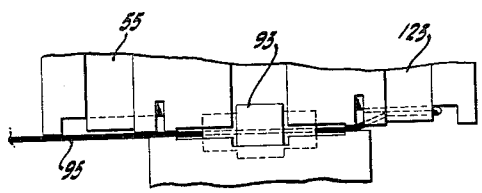
Figure 16:
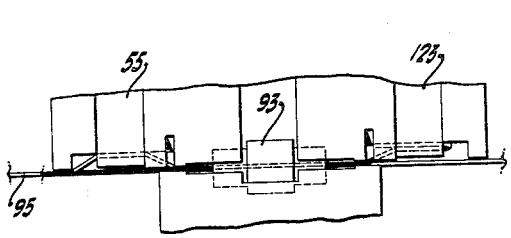

Figs. 14 to 16 inclusive, show, respectively, the position of the gripping elements at the points in the machine cycle shown in Figs. 11 to 13 respectively.

Referring now to the drawings, wherein similar reference numerals are used to designate similar parts throughout the various views, 20 generally indicates a cam shaft mounted parallel to the front face 21 of the gear housing of the machine, adjacent the upper edge thereof, and journaled for rotation in bearings 22a and 23a, respectively, mounted in walls 22 and 23 extending rearwardly at right angles from the front wall 21. Shaft 20 is driven through an overload release clutch 24 by means of a stub shaft 25 journalled in a bearing 26 supported on a bracket 27 fastened to the front wall 21 of the housing. A bevel gear 28 is fastened to the end of the stub shaft 25 and meshes with a bevel gear 29 fixed to the end of the input drive shaft 30. Shaft 30 is adapted to be intermittently driven in the manner described in my above-mentioned copending application.

Figure 4:
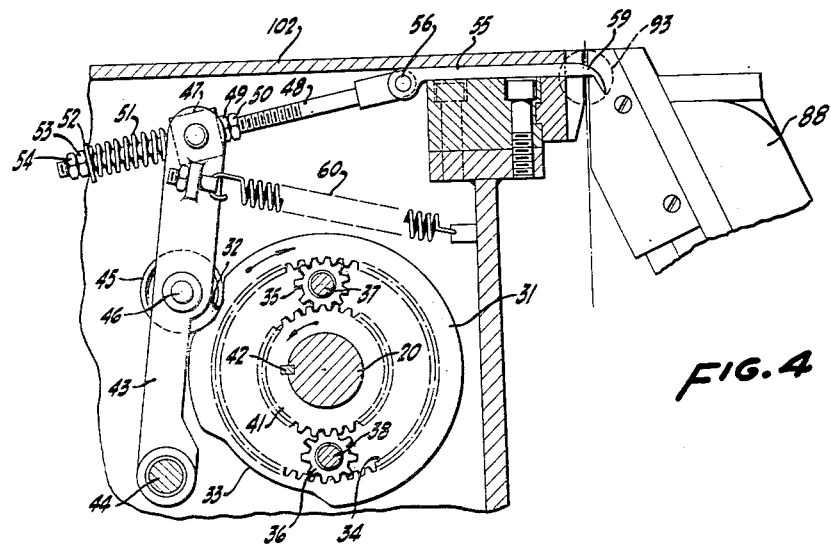

All of the various cams and their associated cam followers in the parts moved thereby shown in Figs. 1 through 7 are shown in the position which they will occupy at the initial point in a cycle of the machine. As best seen in Fig. 4, a gripper actuating cam 31 is rotatably mounted on the shaft 20, said cam having two low portions 32 and 33 for actuating the gripper. An internal ring gear 34 is fixed to the cam and meshes with two planet gears 35 and 36 mounted on two stub shafts 37 and 38 respectively, which in turn are fixed to a bracket 39 fastened to the housing of the machine. The planet gears 35 and 36 are also in mesh with a sun gear 41 keyed to the shaft 20 by a key 42, whereby rotation of the shaft 20 in one direction will rotate the cam 31 in the opposite direction at one-half the speed of the shaft 20, since the ring gear 34 contains twice the number of teeth as the sun gear 41.

A gripper actuating arm 43 is pivotally mounted on one of its ends to a stub shaft 44 fixed to the bracket 39. A cam follower roller 45 is rotatably mounted on a pivot pin 46 attached to the cam actuating arm 43 and intermediate the ends thereof. Said cam roller is adapted to follow the surface of the cam 31 and thus move the arm 43 about its pivot shaft 44 in conformation with the profile of the cam 31.

A block 47 is pivotally mounted to the upper end of the arm 43 and a gripper actuating rod 48 is slidably received therethrough. Movement of the arm 48 with respect to the block in one direction is limited by a nut 49 threaded onto the rod 48 and held in place by a lock nut 50. Movement of the rod 48 in the opposite direction, relative to the block 47, is resisted by a spring 51, one end of which bears against the block 47 and the other end against a spring retainer 52 held on the end of the rod 48 by a nut 53 and a lock nut 54. The opposite end of the rod 48 is bifurcated and is fastened to the rear end of the gripper member 55 by a clevis pin 56. As shown in Fig. 1, the gripper member 55 is adapted to slide in a groove 57 formed in an upper surface of a guide block 58. The forward end of the gripper 55 is turned downwardly to form a hook, whereby when the wire is brought up from underneath the gripper member, it will be hooked thereby, and when the gripper member is moved to the left as shown in Fig. 4 the wire will be pulled back and gripped against the front face of the guide block 58. A tension spring 60 is connected between the front wall of the housing and the upper end of the arm to urge the arm 43 to rotate in a clockwise direction to bring the follower roller 45 into engagement with the surface of the cam 41 and to urge the gripper member 55 to its outwardly extended position.

Figure 5:
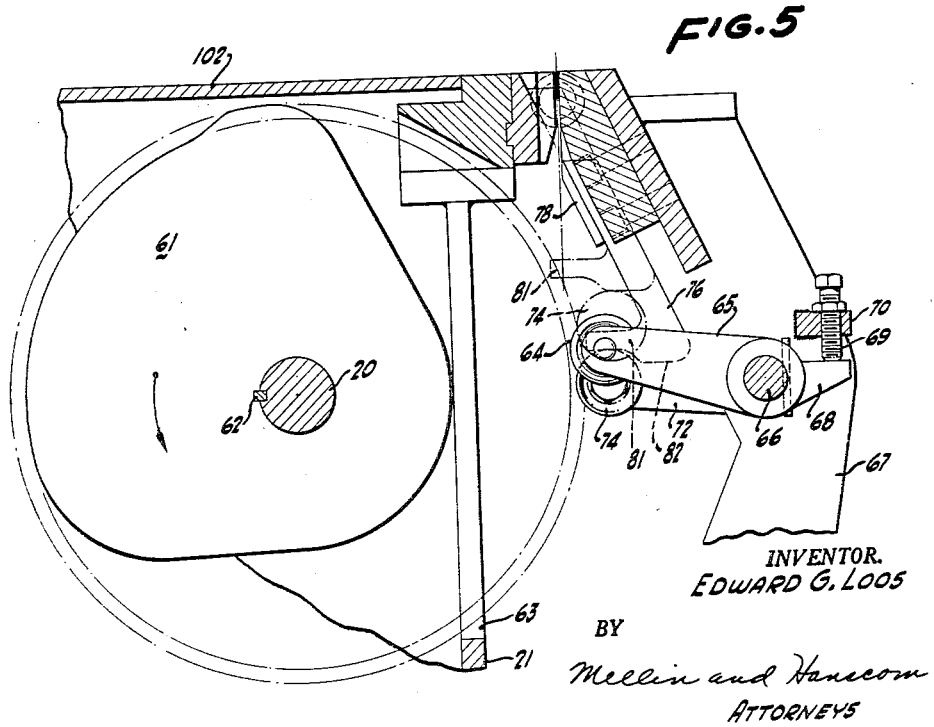

As best seen in Fig. 5 a cutter actuating cam 61 is keyed to the shaft 20 by a key 62, and is adapted upon rotation to extend through a slot 63 formed in the front wall 21 of the housing to contact and actuate a cam follower roller 64. The cam follower roller 64 is mounted on one end of an arm 65, which is keyed at its other end to a shaft 66 rotatably supported by an arm 67 bolted to the front face of the wall 21 at its lower end (not shown) and extending generally upward and spaced from the front face of said wall 21. The upper end of the arm 67 is spaced from the front face of the guide block 58, a distance just sufficient to allow the wire to pass therebetween. A lug 68, formed integral with the arm 65 and extending in the opposite direction is adapted to abut against a stop screw 69 adjustably threaded into a flange 70 on the arm 67 and limit counterclockwise rotation of the shaft 66, as viewed in Fig. 5. Two knife actuating arms 71 and 72 are fastened one at each end of the shaft 66 to be rotated thereby. Two knife actuating rollers 73 and 74 are fastened to the ends of the arms 71 and 72, respectively. Cutting knives 75 and 76 are slidably mounted within guides 77 and 78 fastened one on either side of the upper end of the arm 67, whereby the knives are guided for rectilinear motion diagonally upward, with respect to the front face of the machine, to slide the knives across the slot between upper end of arm 67 and the front face of the guide block 58 to cut the wire extending therebetween. Knife 75 has a laterally projecting portion 79 fixed to the lower end thereof, the laterally extending portion having a lower cam surface 80 in contact with the cam actuating roller 73. Similarly, knife 76 has a laterally extending portion 81 with a lower cam surface 82 in contact with the cam actuating roller 74, whereby clockwise rotation of the shaft 66, under the influence of the cam 61, will rotate the arms 71 and 72 upwardly and force the knives diagonally upward in their guides to cut the wire.

Two cam retracting rods 83 and 84 connected respectively, to the lower ends of the knives 75 and 76, and extending generally downward in the plane of movement of said knives, are attached at their lower ends to the ends of two arms 85 and 86, respectively. The opposite ends of the arms 85 and 86 are keyed to a shaft 87 extending through three flanges 88, 89 and 90 extending outwardly from the rear surface of the arm 67. Between the flange 88 and the flange 90, and surrounding the shaft 87, is a torsion spring assembly, indicated generally at 91, and similarly, between the flanges 89 and 90 there is a second torsion spring assembly indicated generally at 92. The torsion spring assemblies normally urge the shaft 87 to rotate in a clockwise direction, as viewed in Fig. 2, to pull downwardly on the rods 83 and 84 and urge the knives toward their retracted position.

As is usual in machines of this type, the twisting mechanism comprises a twisting member 93 having a slot 94 formed therein to receive the wire in overlapping relation in the manner best shown in Figs. 6 and 10. The twisting member 93 has two laterally extending stub shaft portions 96 and 97 received within two semicircular arcuate grooves 98 and 99 formed in the front face of two twisting member supporting blocks 100 and 101 fastened to the upper surface 102 of the gear housing of the machine. The cutting knife guides 77 and 78 are formed with complementary semicircular arcuate grooves (not shown) which face the grooves 98 and 99, and in this manner the twisting member 93 is rotatably supported. A large sector gear 103 is rotatably supported by a shaft 104 journaled in a bracket 105 fastened to the front face 21 of the housing by bolts 106, and is adapted to oscillate through a slot 108 formed in the front face 21 of the housing. Sector gear 103 meshes with external gear teeth 107 formed on the outer surface of the twisting member 93 intermediate the stub shaft portions 96 and 97.

The mechanism for actuating the sector gear 103 comprises an arm 109 rotatably mounted on the shaft 104 adjacent the sector gear 103, having two laterally projecting flanges 110 and 111 extending into the plane of the sector gear 103. Two adjustment screws 112 and 113 are respectively threaded through the flanges 110 and 111 and bear against the sector gear. By adjustment of said screws, the position of the sector gear 103 relative to the arm 109 may be adjusted and then locked by lock nuts 114 and 115 respectively threaded onto the adjusting screws 112 and 113. A cam follower roller 116 is rotatably mounted on a stub shaft 117 fastened to the arm 109 and is adapted to ride on the surface of a cam 118 keyed to the shaft 20 by a key 119. The sector gear is normally urged counterclockwise, as viewed in Fig. 6, by a spring 120 fastened at one of its ends by a pin 121 to the rear end of the sector gear 103, and at its other end to an intermediate wall 122 in the housing, said wall being spaced from and parallel to the front wall 21.

Figure 7:
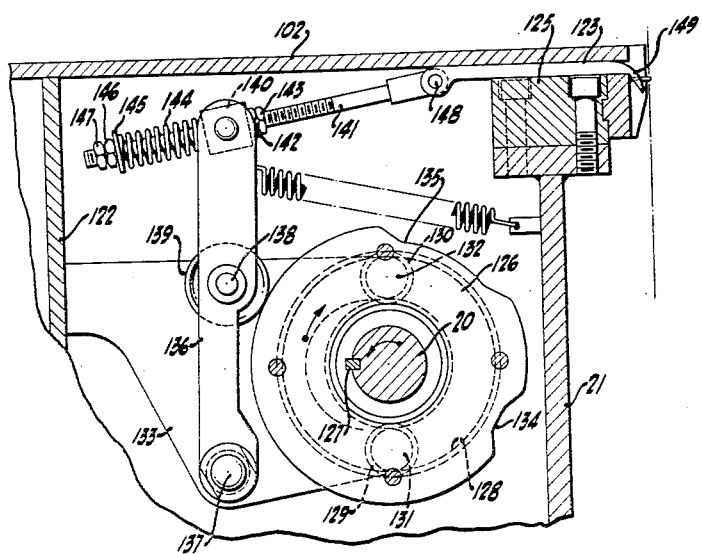

A second gripping member 123 is slidably mounted in a groove 124 in a guide 125 fastened to the frame of the machine at the opposite side of the twisting member 93 from the first gripping member 55. As seen in Fig. 7 a second gripping actuating cam 126 is keyed to the shaft 20 by a key 127. A comparison between Figs. 4 and 7 will show that the two cam members 31 and 126 have exactly the same cam profile but they are rotated 180° with respect to one another. Cam 126 has affixed thereto an internal ring gear 128 in mesh with two planet gears 129 and 130 mounted respectively on stub shafts 131 and 132 fixed to a bracket 133 fastened within the machine.

A second cam actuating arm 136 is pivotally mounted on one of the cams on a stub shaft 137 fixed to the bracket 133. Arm 136 carries a stub shaft 138 intermediate its ends upon which a cam follower roller 139 is rotatably mounted. A block 140 is pivotally mounted to the upper end of the arm 136 and has extending therethrough in sliding relation a cam actuating link 141. Rearward movement of the link 141 is limited by a nut 142 held in place by the lock nut 143. The link 141 is urged toward its rearward position by a spring 144 confined between the block 140 and a spring retainer 145 held on the end of the link 141 by a nut 146 and lock nut 147. The forward end of the link 141 is bifurcated and pivotally attached to the rear end of the gripper member 123 by a clevis pin 148. The forward end of the gripping member is bent down in the manner shown at 149.

The device is operated in the following manner: Wire 95 is brought into the machine and is trained around a wrapping ring 149 illustrated schematically in Figs. 11 through 13. The wrapping ring 149 is mounted and driven by mechanism not shown herein, but fully disclosed in my above mentioned copending application. At the start of the cycle the wrapping ring 149 is in the position shown in Fig. 11 and the end of the wire 95 is gripped by the gripping member 123 in the manner shown in Fig. 14. The gripping member 55 is in extended relation, having just dropped the loop of wire 150 cut off at the end of the previous cycle of the machine. As the ring commences to rotate, the shaft 20 is rotated sufficiently to rotate the cam 31 far enough so that the cam follower 45 is no longer in registry with the low point 32, thus moving the gripping member 55 inwardly to the position shown in 15, whereby the wire being brought upwardly adjacent the front face of the machine will clear the gripping member and will not be caught thereby. This portion of the cycle is illustrated in Figs. 12 and 15. The drive mechanism for the cam shaft 20 is such that at this point the cam shaft will temporarily cease to rotate while the wrapping ring continues to wrap the wire around the parcel to be packaged. Such a drive mechanism is fully described in my copending application.

As the wrapping ring completes its cycle of approximately one and one-half revolutions, the cam shaft again commences to rotate and the cam 31 is rotated to bring the low point 33 on the cam into register with the cam roller 45, thus extending the gripping cam 55 to the position shown in Fig. 14 so that the second time the wire is brought upwardly past the front face of the machine by the action of the wrapping ring 149, the gripper 55 will hook the wire. Upon further rotation of the cam shaft 20, the low point 33 at the cam 31 passes the roller 45 and the gripper is again brought back to the position shown in Fig. 16, wherein the wire is held tightly thereby. The cam 118 then contacts the roller 116 and actuates the sector gear 103 to rotate the twisting member 93 to twist the overlapped portions of the wire together. It will be noted that the cam 118 rises to a peak at 151 and then backs off slightly to the position shown at 152. The twisting member 93 is given two and one-half revolutions plus a predetermined portion of a revolution and then is returned to the position of two and one-half revolutions so that the slot is then extending vertically upward. At this point the cam 61 contacts the roller 64 and actuates the cutting knives, forcing the knives 75 and 76 upwardly to cut the wire adjacent the inside edge of each of the gripping members 55 and 123. When the wire has been cut, the tension of the wire will pull the twisted and cutoff wire upwardly out of the slot 94 to lie close adjacent to the package.

After the cutting off operation has been completed, the cam shaft 20 rotates a further increment to allow the cam follower 116 to drop off the end of the cam 118 and the sector is returned to its original position by virtue of the spring 120. Similarly, the cam 161 clears the cam follower roller 64 and allows the knives to be retracted by the retracting mechanism described above. The cam 126 assumes a position 180° from that shown in Fig. 7, whereby the roller 139 will be in register with the low point 134 and the gripping member 123 will be extended to release the cutoff end of the wire 95. The machine will then be in condition for the succeeding cycle of operation, wherein the wrapping ring 149 is rotated in the opposite direction by the machanism fully described in my copending application. On the succeeding cycle of operation the gripping member 55 will remain in its grip position and the gripping member 123 will perform the functions attributed to gripping member 55 during the cycle described above. This alternate operation of the gripping members during succeeding cycles is made possible by the fact that the cams controlling the operation of the gripping members rotate at one-half the speed of the cam shaft.

While I have shown the preferred form of my invention it is to be understood that various changes may be made in its construction by those skilled in the art without departing from the spirit of the invention as defined in the appended claims.

Having thus described my invention, what I claim and desire to secure by Letters Patent is:

1. In a wire tying machine, a mechanism comprising a camshaft mounted for rotation, means for intermittently rotating said camshaft one complete revolution while completing each cycle of the machine, means for twisting the tying wires, cam means on said camshaft for rotating said twisting means, wire gripping means adjacent each end of said twisting means, cam means for alternately actuating each of said gripping means on succeeding cycles of the machine, said last named cam means comprising a pair of cams each being mounted upon an axis concentric with said camshaft and each having the same cam profile but one of said cams being rotated 180° with respect to the other; and means for mounting said pair of cams comprising sun gears mounted on said camshaft, a ring gear fixedly attached to each of said cams, and planet gears rotatably mounted on fixed shafts and meshing with one of said sun gears and one of said ring gears, said ring gears each having twice the number of teeth on its associated sun gear, whereby said cams will rotate one-half revolution for each revolution of said camshaft and actuate said gripping means alternately on succeeding cycles of said machine.

2. In a wire tying machine, a mechanism comprising a camshaft mounted for rotation, means for intermittently rotating said camshaft one complete revolution while completing each cycle of the machine, means for twisting the tying wires, cam means on said camshaft for rotating the twisting means, wire gripping means adjacent each said twisting means, cam means for alternately end of said twisting means, cam means for alternately actuating each of said gripping means on succeeding cycles of the machine, said last named cam means comprising a pair of cams each being mounted upon an axis concentric with said camshaft and each having the same cam profile but one of said cams being rotated 180° with respect to the other; means for mounting said pair of cams comprising sun gears mounted on said camshaft, a ring gear fixedly attached to each of said cams, and planet gears rotatably mounted on fixed shafts and meshing with one of said sun gears and one of said ring gears, said ring gears each having twice the number of teeth on its associated sun gear, whereby said cams will rotate one-half revolution for each revolution of said camshaft and thus actuate said gripping means alternately on succeeding cycles of said machine; and a cutting means adjacent said gripping means comprising a pair of slidably mounted cutting knives, each knife being independently operable, a pair of actuating arms, one for each knife, and cam means mounted on said camshaft for simultaneous operation of said actuating arms.

References Cited in the file of this patent

UNITED STATES PATENTS

| | | |
|---|---|---|
| 931,850 | Ehlin | Aug. 24, 1909 |
| 1,326,030 | Coon | Dec. 23, 1919 |
| 2,042,843 | Harvey | June 2, 1936 |
| 2,088,133 | Evans | July 27, 1937 |
| 2,111,115 | Gibbs | Mar. 15, 1938 |
| 2,124,770 | Evans | July 26, 1938 |
| 2,330,629 | Schmidt | Sept. 28, 1943 |
| 2,375,769 | Childress | May 15, 1945 |
| 2,601,151 | Keller | June 17, 1952 |